Figure 3:
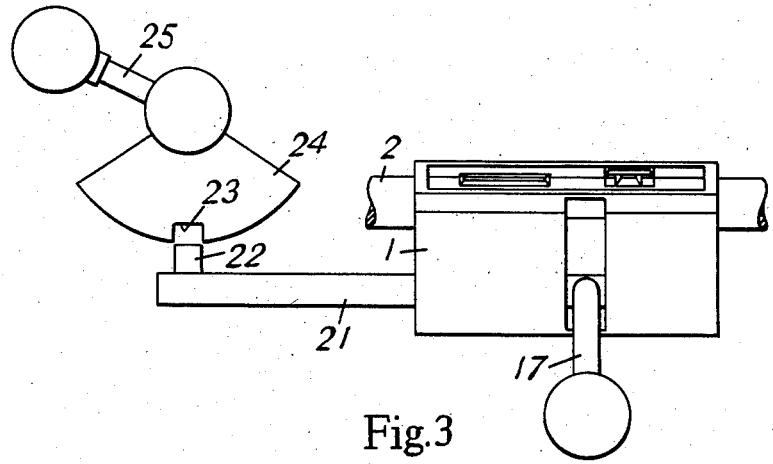

May 12, 1959 A. J. FIRTH 2,885,901
MACHINE TOOL FEED MECHANISM
Filed June 20, 1957 2 Sheets-Sheet 1
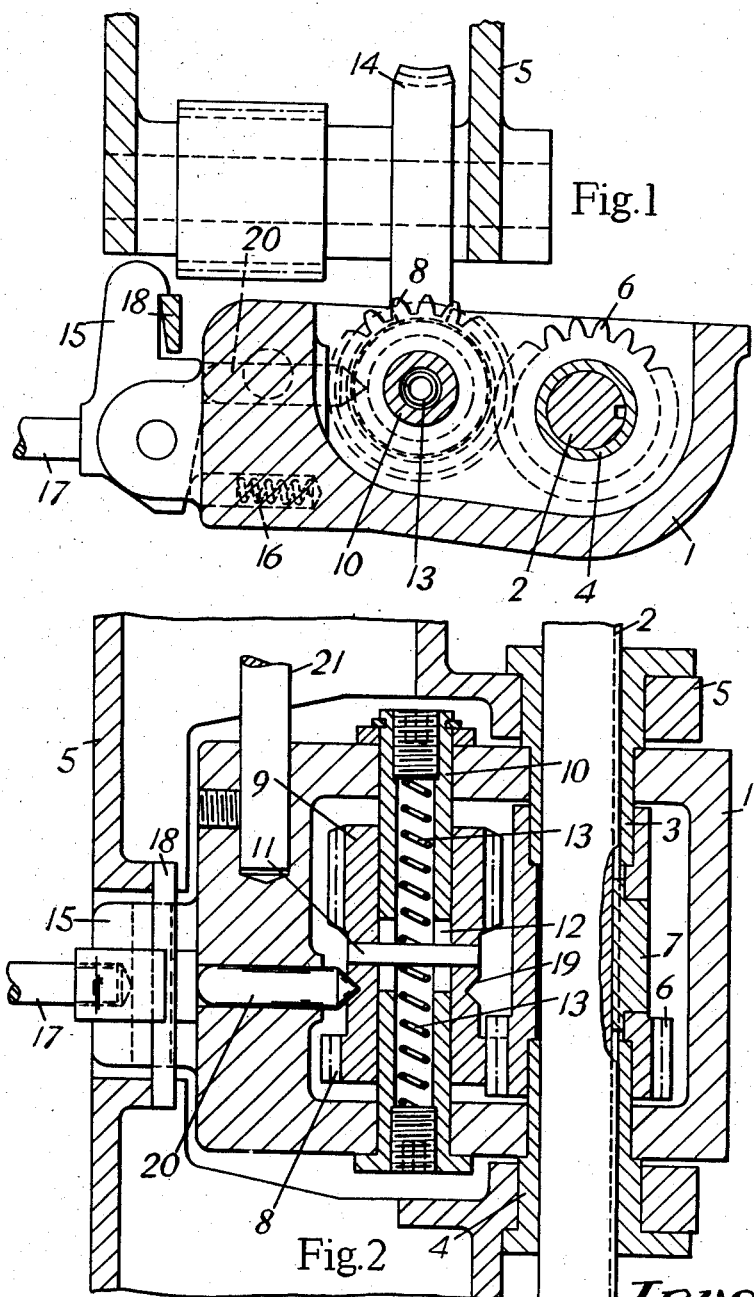
Inventor
A. J. Firth
By Glascock Downing Seebold
Attys May 12, 1959  A. J. FIRTH  2,885,901
MACHINE TOOL FEED MECHANISM
Filed June 20, 1957  2 Sheets-Sheet 2

Inventor
A. J. Firth
By Glascock Downing Seebold
Attys ly and slidably supported on a rotary feed shaft 2 by a pair of coaxial hollow trunnions 3, 4 which extend into opposite ends of the housing and which can slide along the shaft, the trunnions being themselves secured to another slidable housing 5 containing other parts of the feed mechanism.

2,885,901

MACHINE TOOL FEED MECHANISM

Arthur J. Firth, St. Osyth, England, assignor to The Colchester Lathe Company Limited, Colchester, England Application June 20, 1957, Serial No. 666,829

Claims priority, application Great Britain June 25, 1956

2 Claims. (Cl. 74—405)

This invention relates to a lathe or other machine tool feed mechanism of the kind for transmitting motion from a rotary shaft to a longitudinally or transversely movable slide through an intermediate gear train, the object of the invention being to provide in a convenient and sensitive form a tripping device for arresting the feed motion when the slide encounters a stop, or an accidental obstruction.

A tripping device in accordance with the invention includes an axially movable and spring loaded worm or other helically toothed member forming part of the feed mechanism and carried by a pivotally supported housing, a catch for securing the housing in its normal working position, and a catch-releasing means responsive to axial movement of the said helically toothed member when an abnormal torque is imposed thereon.

In the accompanying drawings Figures 1 and 2 are respectively a sectional end elevation and a sectional plan of a mechanism embodying the invention. Figure 3 is a diagrammatic illustration of an auxiliary feature of the invention.

In the example shown by the drawings and applicable to the feed motion of a lathe slide, a housing 1 is pivotally and slidably supported on a rotary feed shaft 2 by a pair of coaxial hollow trunnions 3, 4 which extend into opposite ends of the housing and which can slide along the shaft, the trunnions being themselves secured to another slidable housing 5 containing other parts of the feed mechanism.

On the inner ends of the trunnions is supported a hollow pinion 6 which has a key or spline connection 7 with the shaft. The pinion engages a complementary pinion 8 on one end of a worm 9 (or other helically toothed member) which is slidably supported on a hollow rotatable spindle 10, the latter being supported at its ends by the housing 1. The worm 9 is connected to the said spindle by a transverse pin 11 which passes through a slot 12 in the spindle, and within the spindle are contained a pair of springs 13, which abut against the opposite sides of the pin. The worm is engageable with a toothed wheel 14, forming a part of the slide feed mechanism and contained in the other housing 5 above mentioned, and on the worm housing 1 is pivotally mounted a catch 15 which is loaded by a spring 16 and operable by a hand lever 17. The catch is engageable with a keeper 18 on the housing 5 for holding the worm in its operative position. On the worm is formed a cam, which may conveniently consist of a V-shaped circumferential groove 19 between the worm 9 and its associated pinion 8, and in the housing 1 is supported a plunger 20, which is situated at right angles to the axis of the worm. One end of the plunger is shaped to co-operate with the cam, and the other end abuts against one side of the catch.

The arrangement is such that when the worm housing 1 is raised by means of the hand lever 17 for engaging the worm 9 with the associated wheel 14, the housing 1 is held in this position by engagement of the catch 15 with the keeper 18 and the springs 13 are such that they can prevent axial movement of the worm so long as the torque imposed on the worm does not exceed that required for transmitting the required feed movements. But when the slide encounters a stop, or is obstructed by some accidental condition, the worm will move axially against one or the other of the springs, causing the plunger 20 to move endwise and release the catch. The worm housing then falls downwardly about the axis of its trunnions, causing the worm to be disengaged from the associated member of the feed train.

When the mechanism is used in combination with a screw cutting mechanism which includes a nut and lead screw, an interlocking bar 21 is provided at one side of the worm housing 1 to prevent accidental engagement of the nut with the screw when the worm 9 is in its engaged position.

This feature is illustrated diagrammatically at Figure 3. On the bar 21 is formed or secured a lateral projection 22 which can be engaged with a notch 23 in a quadrant 24. The latter is operable by the handle 25 which actuates the nut of the lead screw. When the worm 9 is moved into engagement with the wheel 14, the projection 22 is moved into engagement with the notch 23 and so holds the nut out of engagement with the lead screw of the screw cutting mechanism. Before the said mechanism can be brought into action the worm 9 must be disengaged from the wheel 14 by downward movement of the housing 1. The projection 22 is thereby withdrawn from the notch 23 leaving the handle 25 free to engage the nut with the lead screw.

By this invention, not only is a sensitive control of the catch obtained, but as the worm housing is supported independently of the driving shaft, a smooth feed motion is also ensured.

Whilst the invention is primarily required for use on lathes, it may be applied also in essentially the same manner to the feed mechanisms of other machine tools.

Having thus described my invention what I claim as new and desire to secure by Letters Patent is:

1. In a tool feed mechanism of the kind having a rotary shaft, a slide and a gear train for transmitting motion from the shaft to the slide, a tripping device comprising in combination a first helically toothed member forming a part of the feed mechanism, and capable of rotary and axial motion, a cam on said first toothed member, a housing through which said shaft extends, and which is capable of pivotal movement about the axis of said shaft into and out of a service position, a hollow spindle by which said first toothed member is supported within said housing, and which is carried by said housing in parallel relationship to said shaft, a first pinion rigid with said first toothed member, a second pinion mounted on said shaft and engaging said first pinion, a pin secured to said first toothed member and extending through a slotted part of said spindle to interconnect said first toothed member and said spindle whilst permitting axial movement of said first toothed member on said spindle, a second rotatable toothed member forming another part of said gear train with which said first toothed member is engaged when said housing is in its service position, and from which said first toothed member is disengageable by pivotal movement of said housing out of its service position, springs mounted within said hollow spindle and acting on said pin to prevent axial movement of said first toothed member until an abnormal torque is imposed thereon, a spring-loaded catch carried by said housing for retaining the latter in its service position, and a plunger operable by said cam for releasing said catch in response to axial movement of said first toothed member.

2. A tool feed mechanism and tripping device according to claim 1, and having in combination hollow trunnions through which said shaft passes, and by which said housing is pivotally supported, and a second housing from which said trunnions extend, and which contains other parts of said feed mechanism.

References Cited in the file of this patent

UNITED STATES PATENTS

| | | |
|---|---|---|
| 2,544,809 | Stanley | Apr. 13, 1951 |
| 2,578,533 | Garrahan | Dec. 11, 1951 |
| 2,695,089 | Unk, et al. | Nov. 23, 1954 |
| 2,804,781 | Kietz | Sept. 3, 1957 |

FOREIGN PATENTS

| | | |
|---|---|---|
| 715,588 | France | Dec. 5, 1931 |